(12) United States Patent
Hetzer et al.

(10) Patent No.: US 6,625,382 B2
(45) Date of Patent: Sep. 23, 2003

(54) CONFIGURATION FOR AN OPTICAL DEVICE INTERFACE

(75) Inventors: Ulrich Hetzer, Berlin (DE); Tilmann Schilling, Berlin (DE)

(73) Assignee: Francotyp Postalia AG & Co., Birkenwerder (DE)

( * ) Notice: Subject to any disclaimer, the term of this patent is extended or adjusted under 35 U.S.C. 154(b) by 167 days.

(21) Appl. No.: 09/840,555

(22) Filed: Apr. 23, 2001

(65) Prior Publication Data

US 2001/0033717 A1 Oct. 25, 2001

(30) Foreign Application Priority Data

Apr. 22, 2000 (DE) .......................... 100 21 251

(51) Int. Cl.⁷ ................................ G02B 6/00
(52) U.S. Cl. ........................... 385/147; 385/12
(58) Field of Search ..................... 385/147, 12, 31, 385/88, 84, 100, 116

(56) References Cited

U.S. PATENT DOCUMENTS

| 4,310,754 A | 1/1982 | Check, Jr. |
| 4,752,950 A | * 6/1988 | Le Carpentier ........ 379/106.11 |
| 5,047,761 A | 9/1991 | Sell |
| 5,155,784 A | 10/1992 | Knott |
| 5,388,102 A | * 2/1995 | Griffith et al. ............... 370/512 |
| 5,949,444 A | * 9/1999 | Geserich et al. ................. 347/4 |
| 6,045,278 A | * 4/2000 | Kubatzki et al. ........... 400/635 |
| 6,178,410 B1 | 1/2001 | Kunde et al. |

FOREIGN PATENT DOCUMENTS

| DE | 39 04 657 A1 | 8/1990 | |
| DE | 41 42 175 A1 | 6/1993 | |
| DE | 198 51 265 A1 | 5/2000 | |
| EP | 0 485 196 B1 | 5/1992 | |
| EP | 0 634 625 A2 | 1/1995 | |
| EP | 0901108 A2 * | 3/1998 | .......... G07B/17/00 |
| EP | 0876864 A2 * | 7/1998 | .......... B21F/27/02 |
| EP | 0 875 864 A2 | 11/1998 | |
| GB | 2 145 239 A | 3/1985 | |

* cited by examiner

*Primary Examiner*—Frank G. Font
*Assistant Examiner*—Kevin Kianni
(74) *Attorney, Agent, or Firm*—Laurence A. Greenberg; Werner H. Stemer; Gregory L. Mayback

(57) ABSTRACT

A configuration for an optical device interface makes use of the employment of rigid pieces of optical waveguide disposed between a measuring location and a transmitting location in an optical device. A transmitting and receiving device is provided on the main circuit board of a franking machine for the purpose of communicating with the device in which optical signals are transmitted. The optical signals are led back to the main circuit board of the franking machine through the rigid pieces of optical waveguide in the optional device and in the franking machine.

10 Claims, 2 Drawing Sheets

CONFIGURATION FOR AN OPTICAL DEVICE INTERFACE

BACKGROUND OF THE INVENTION

Field of the Invention

The invention relates to a configuration for an optical device interface having a device and a main circuit board that is disposed remotely from the device and has a control device. The invention is used in franking machines when they are coupled optically to optional peripheral devices, or between stations in a mail processing machine.

Modern franking machines, because of their extensive electronics, are often susceptible to electrostatic charges and magnetic interference fields. For this reason, Published, European Patent Application EP 876 864 A2 has already proposed a configuration for communication between stations in a mail processing machine. In this case, although optocouplers are used, here they are only used for decoupling between the meter and base of the JETMAIL franking machine. The coupling between the stations in the mail processing machine is, however, again carried out electrically via plug-in connectors.

German Patent DE 196 05 015 C1, corresponding to U.S. Pat. No. 5,949,444, has already explained the printing device of the JETMAIL franking machine in more detail which, in a non-horizontal, approximately vertical transport of letters, carries out franking printing by an ink jet print head disposed in a stationary position in a recess behind a guide plate. A triggering sensor for the printing process is disposed shortly upstream of the ink jet print head recess. It is used to detect the start of a letter and interacts with an incremental transmitter for a travel control system. In the JETMAIL franking machine, the printing process is triggered by a transmitted light barrier in the franking machine (see Published, European Patent Application EP 901 108 A2). Using the latter, the leading edge of even particularly thick items of mail is unequivocally detected. In addition, in the JETMAIL franking machine, further optical sensors are used to detect the build-up of items of mail and for travel control. The aforementioned sensors and at least one sensor of an optional device are likewise connected to the control system of the franking machine. The device is, for example, a deposit box without its own voltage supply. In order to fulfil sensor functions of such an optional device, the transmission of a voltage requires a transmission of an electrical voltage between the devices, which are correspondingly configured for this purpose. Mounting all the sensors, including their fixing and equipment with plug-in connectors and with cables leading to the main circuit board in the devices, as well as the interfaces and cables for communication between the stations, necessitate high production costs, however. All the previous solutions, which use electrical interfaces with plug-in connectors and cables between the devices, on the one hand, and a sensor system with its own voltage supply in the optional devices, on the other hand, have to be protected in a complicated manner against electromagnetic interference fields.

SUMMARY OF THE INVENTION

It is accordingly an object of the invention to provide a configuration for an optical device interface which overcomes the above-mentioned disadvantages of the prior art devices of this general type.

The invention is based on the object of developing a configuration for an optical device interface which makes reliable, cost-effective data communication between a franking machine and optional devices possible, the latter being equipped with and without their own voltage sources. The optical device interface is intended to entail only low production costs. When fulfilling sensor functions in the optional device without its own supply voltage, the intention is to make the omission of the voltage supply devices possible.

With the foregoing and other objects in view there is provided, in accordance with the invention, a configuration for an optical device interface. The configuration contains a device having first optical waveguides and a franking machine disposed remotely from the device. The franking machine has a main circuit board, a transmitting and receiving unit disposed on the main circuit board, and second optical waveguides connected to the transmitting and receiving unit and communicating with the first optical waveguides. The transmitting and receiving unit communicates with the device by transmitting optical signals over the second optical waveguides.

In accordance with an added feature of the invention, the first optical waveguides detect objects at a measuring location disposed between the first optical waveguides in the device in accordance with a transmitted light principle known per se.

In accordance with an additional feature of the invention, the franking machine has a receiving diode disposed on the main circuit board and a print head, and the device has a circuit board and a transmitting diode disposed on the circuit board. The device has a transmitting location disposed in a stream of mail upstream of a printing location at which the print head of the franking machine can be positioned.

In accordance with another feature of the invention, the first optical waveguides are provided for data polling.

In accordance with a further feature of the invention, the transmitting and receiving unit has a transmitting diode disposed on the main circuit board, and the device has a circuit board and a receiving diode disposed on the circuit board.

In accordance with another added feature of the invention, the first optical waveguides and the second optical waveguides are for fixing and focusing a light beam and are transparent plastic optical waveguides.

In accordance with another additional feature of the invention, the transmitting and receiving unit has a clocked light-emitting diode to minimize stray light and increase a sampling reliability.

In accordance with another further feature of the invention, the franking machine has a print head, and the measuring location is disposed in the device along a mail stream upstream of a printing location at which the print head belonging to the franking machine can be positioned.

In accordance with a feature of the invention, the franking machine has a print head, and the measuring location is disposed in the device along a mail stream downstream of a printing location at which the print head belonging to the franking machine can be positioned.

In accordance with yet another feature of the invention, at the measuring location or the transmitting location in the device, various pieces of the first optical waveguides permit clocked polling of a plurality of sensors.

With the foregoing and other objects in view there is further provided, in accordance with the invention, a configuration for an optical device interface. The configuration contains a device, a main circuit board having a control device, a transmitting and receiving unit disposed on the main circuit board; and rigid pieces of optical waveguide connecting the device to the main circuit board. The transmitting and receiving unit communicate with the device by transmitting optical signals over the rigid pieces of optical waveguide.

A franking machine or another mail processing device which transports items of mail has a housing with an opening for the supply of items of mail. The franking machine has a main circuit board disposed in the interior for controlling the franking machine. The distance between the main circuit board of the franking machine to a location in an optional device is bridged by the inventive use of rigid pieces of optical waveguide. The rigid pieces of optical waveguide and the transmitting and receiving unit on the main circuit board are used for signal transmission in connection with the data communication and sensor systems in the optional devices.

Other features which are considered as characteristic for the invention are set forth in the appended claims.

Although the invention is illustrated and described herein as embodied in a configuration for an optical device interface, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
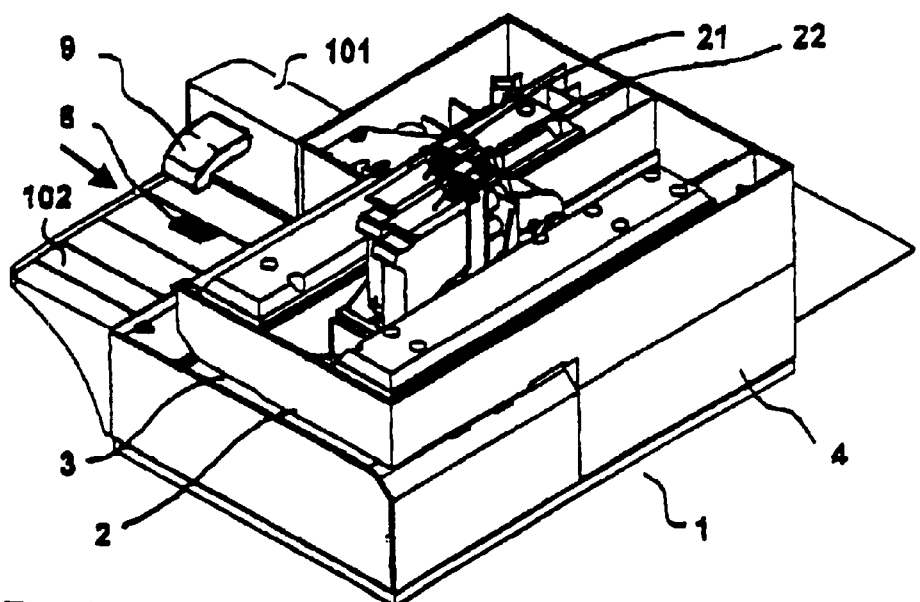
FIG. 1 is a diagrammatic, perspective view of a franking machine, open at the top, and a first optional device according to the invention.

In all the figures of the drawing, sub-features and integral parts that correspond to one another bear the same reference symbol in each case. Referring now to the figures of the drawing in detail and first, particularly, to FIG. 1 thereof, there is shown a perspective view of a franking machine 1, open at the top, and a first optional device 101 for supplying items of mail. The optional device 101 can be constructed as a supply station 101 without its own voltage supply. The franking machine 1 has a slot-like opening 3 in its housing 4. The transport direction for an item of mail which is supplied—but not shown—is identified by an arrow and runs from the top left to the bottom right. A support plate 102 belonging to the supply station 101 has an opening 6. An item of mail placed on it would cover the opening 6, so that a piece of optical waveguide 9 disposed on the supply station 101 can no longer communicate through the opening 6 with a further piece of optical waveguide 11 (see FIG. 2). During its further transport, the item of mail comes to rest on a guide plate 2 of the franking machine 1. The housing 4, open at the top, has two ink jet print heads 21, 22 belonging to the franking machine 1 and positioned in a printing position.

Figure 2:
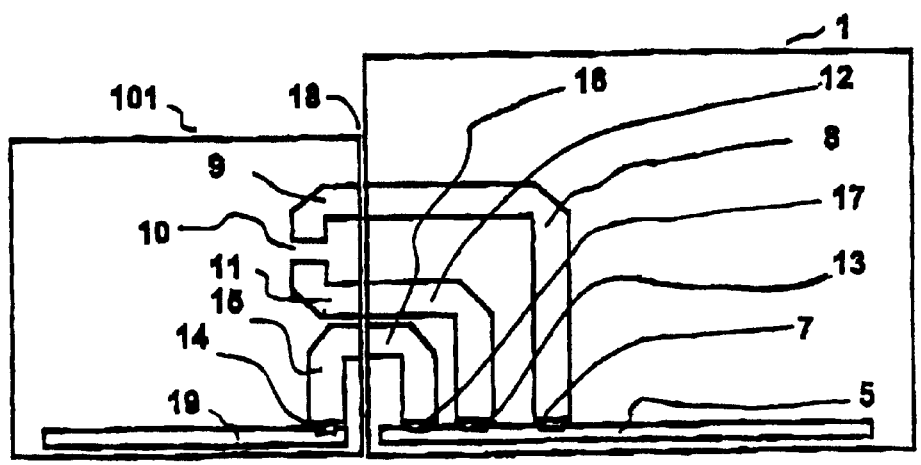
FIG. 2 is a side-elevational view of the franking machine with the first optional device.

FIG. 2 shows a schematic side view of the franking machine 1 with the first optional device 101. The optional device 101 has a measuring location 10 in the first embodiment. Between the franking machine 1 and the measuring location 10, reliable and cost-effective data communication can be made possible, via pieces of optical waveguide 8, 9, 11, 12, without any shielding or voltage transmission being needed. By infrared light, a physical distance 18 between the pieces of optical waveguide 9 and 11 belonging to the device 101 and the pieces of optical waveguide 8 and 12 belonging to the franking machine 1, and a distance at the measuring location 10 between the pieces of optical waveguide 9 and 11 belonging to the device 101 are bridged. In the interior, the franking machine 1 has a main circuit board 5 with transmitting and receiving devices 7 and 13, and with associated rigid pieces of optical waveguide 8 and 12. One piece of the optical waveguide 8, has an angled form, for example, and is intended to meet a piece of the optical waveguide 9 which is disposed in the optional device 101. One piece of the optical waveguide 11 is disposed in the optional device 101 and is intended to meet a piece of the optical waveguide 12 which is disposed in the franking machine 1. The piece of the optical waveguide 12 communicates with the piece of the optical waveguide 11 belonging to the optional device 101, for example through the opening 6 in the support plate 102 (as shown in FIG. 1).

A light-emitting diode LED in the franking machine 1 is used as the transmitting device 7. If the LED 7 is permanently energized, a forward current would have to be reduced to less than 90 mA, which necessarily reduces the luminous intensity of the emitted light. This could increase the risk of stray-light influence on the measurement result. Provision is therefore made for the light-emitting diode LED 7 to be clocked in order to minimize the stray light. In the case of a 10 $\mu$s pulse, a surge current of 3 A is still admissible for the LED 7 of the type LD 274 (Siemens). Clocking reduces the current consumption and increases the sampling reliability with respect to permanent energization of the LED 7. For example, in the LED 7 of the type LD 274 (Siemens), a pulse of 20 ms can cause a forward current of 100 mA in order to produce focussed infrared light at a wavelength of about 950 nm with a luminous intensity which permits a number of centimeters distance at the measurement location 10 and between the devices 1, 101 to be bridged.

As an alternative to the first embodiment, or in addition, provision is made for data communication to take place between the franking machine 1 and the optional device 101 with its own voltage source. For this purpose, a circuit board 19 with a transmitting device 14 and a rigid piece of optical waveguide 15 is disposed in the interior of the optional device 101. Another rigid piece of optical waveguide 16 has a matched shape and is disposed in the franking machine 1. The piece of optical waveguide 16 leads the infrared light to a receiving device 17 on the main circuit board 5 of the franking machine 1 if the distance 18 between the two pieces of optical waveguide 15, 16 is overcome. The location in the optional device is a transmitting location in the second embodiment.

Provision is made for the rigid pieces of optical waveguide 8, 9, 11, 12, 15, 16 for fixing and focussing the infrared light beam to be configured as transparent plastic optical waveguides. The plastic optical waveguide preferably consists of polycarbonate and is known under the name "Acryl".

It is possible for both embodiments of the invention to be implemented in a single optional device, as shown in FIG. 2. The embodiments of the invention can, however, also be implemented in separate optional devices.

Figure 3A:
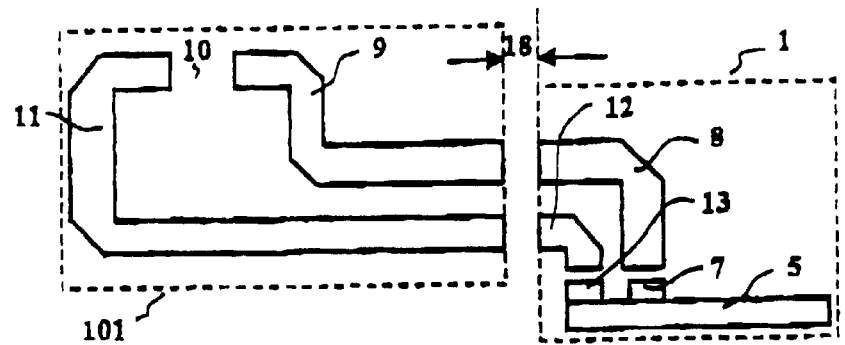
FIG. 3a is a section view through the franking machine and the first optional device.

FIG. 3a shows a section through the franking machine 1 and the first optional device 101 in a schematic side view, the section running through the measuring location 10. The first optional device 101 with the measuring location 10 does not have its own power supply, but has the following features.

The configuration of the transmitting and receiving diodes 7, 13 on the main circuit board 5 of the franking machine 1.

The configuration of at least the first transparent piece of plastic optical waveguide 8, 12 for fixing and focussing a light beam in the franking machine 1 for the purpose of communication with the optional device 101.

The configuration of the second transparent piece of plastic optical waveguide 9 in the optional device 101 in such a way that the light beam transmitted by the franking machine 1 is picked up and focussed.

The configuration of the third transparent piece of plastic optical waveguide 11 in the optional device 101 for the detection of objects in the light beam, and the configuration of the transparent piece of plastic optical waveguide 12 in the franking machine 1 for the purpose of leading the light beam back.

The optional device 101 provided can be, for example, a depositing device located in the stream of mail downstream of the franking device 1 and having a sensor which can detect a build-up of items of mail or the fact that the deposition height has been reached. The invention permits sensor functions to be fulfilled in the optional device 101 without the latter having its own voltage supply, and the omission of the voltage supply.

Figure 3B:
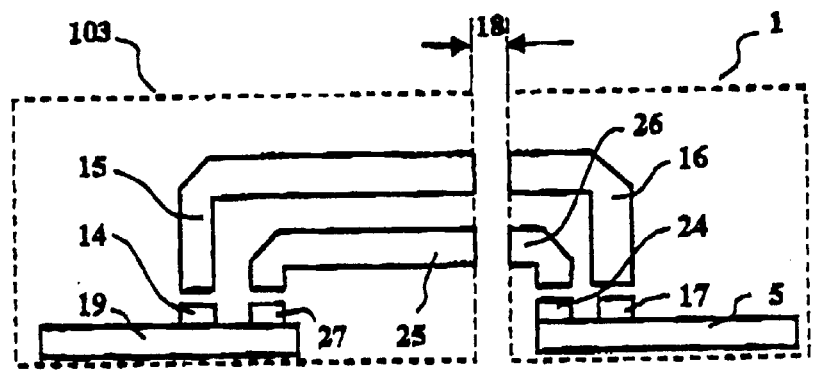
FIG. 3b is a section view through the franking machine and a second optional device.

FIG. 3b shows a section through the franking machine 1 and a second optional device 103 in a side view. Here, however, the second optional device 103 has its own power supply and the following features.

The configuration of the receiving diode 17 on the main circuit board 5 of the franking machine 1, and of the transmitting diode 14 on the circuit board 19 of the second optional device 103. The optional configuration of a transmitting diode 24 on the main circuit board 5 of the franking machine 1, and of a receiving diode 27 on the circuit board 19 of the second optional device 103.

The configuration of at least the first transparent piece of plastic optical waveguide 16 for fixing and focussing a light beam in the franking machine 1 for the purpose of communication with the optional device 103.

The configuration of the second transparent piece of plastic optical waveguide 15 in the optional device 103 in such a way that the light beam is picked up and focussed.

The configuration of the pieces of plastic optical waveguide 15, 25 in the second optional devices 103 for the purpose of data polling.

The optional device 103 provided can be, for example, a supply device located in the stream of mail upstream of the franking machine 1 and having at least one sensor and a motor or other actuator. The clocked polling of a plurality of sensors (light barriers, motor encoders . . . ) can be carried out via various devices and various pieces of plastic optical waveguide or via a common device and the same plastic optical waveguide (two pieces).

The transmitting and receiving devices 7 and 13 and, respectively, 14 and 17 or 24 and 27 may be laser diodes, LED and photodiodes, phototransistors or another suitable light source or opto/electric converter. Use is preferably made of a transmitting diode with a very narrow radiation angle, high pulse loading capacity and reliability. For example, a GaAs infrared light-emitting diode type LD 274 from Siemens is suitable. The phototransistor used can be, for example, an NPN silicon phototransistor, type SFH 300 from Siemens.

The invention is not restricted to the present embodiment. Instead, a number of variants are conceivable within the scope of the claims. For example, it is obviously possible for further other embodiments of the invention to be developed or used which, starting from the same basic idea of the invention, are covered by the appended claims.

We claim:

1. A configuration for an optical device interface, comprising:

a device having first optical waveguides, a circuit board and a transmitting diode disposed on said circuit board; and a franking machine disposed remotely from said device and having a print head, a main circuit board, a transmitting and receiving unit disposed on said main circuit board, a receiving diode disposed on said main circuit board and second optical waveguides connected to said transmitting and receiving unit and communicating with said first optical waveguides, said transmitting and receiving unit communicating with said device by transmitting optical signals over said second optical waveguides;

said device having a transmitting location disposed in a stream of mail upstream or downstream of a printing location at which said print head of said franking machine can be positioned for bridging a physical distance between said first and second optical waveguides.

2. The configuration according to claim 1, wherein said first optical waveguides detect objects at a measuring location disposed between said first optical waveguides in said device in accordance with a transmitted light principle known per se.

3. The configuration according to claim 2, wherein said measuring location is disposed in said device along a mail stream downstream of said printing location.

4. The configuration according to claim 2, wherein said measuring location is disposed in said device along a mail stream downstream of said printing location.

5. The configuration according to claim 2, wherein at said measuring location in said device, various pieces of said first optical waveguides permit clocked polling of a plurality of sensors.

6. The configuration according to claim 1, wherein said first optical waveguides are provided for data polling.

7. The configuration according to claim 1, wherein said transmitting and receiving unit has a transmitting diode disposed on said main circuit board, and said device has a receiving diode disposed on said circuit board.

8. The configuration according to claim 1, wherein said first optical waveguides and said second optical waveguides are for fixing and focusing a light beam and are transparent plastic optical waveguides.

9. The configuration according to claim 1, wherein said transmitting and receiving unit has a clocked light-emitting diode to minimize stray light and increase a sampling reliability.

10. The configuration according to claim 1, wherein at said transmitting location in said device, various pieces of said first optical waveguides permit clocked polling of a plurality of sensors.

* * * * *